United States Patent
Bacarella et al.

(10) Patent No.: US 10,423,726 B2
(45) Date of Patent: Sep. 24, 2019

(54) MACHINE LEARNING TO INTEGRATE KNOWLEDGE AND NATURAL LANGUAGE PROCESSING

(71) Applicant: International Business Machines Corporation, Armonk, NY (US)

(72) Inventors: David Bacarella, Schaumburg, IL (US); James H. Barnebee, IV, Winter Park, FL (US); Nicholas Lawrence, Milwaukee, WI (US); Sumit Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 15/866,698

(22) Filed: Jan. 10, 2018

(65) Prior Publication Data

US 2019/0213258 A1  Jul. 11, 2019

(51) Int. Cl.
 *G06F 17/28* (2006.01)
 *G06F 17/27* (2006.01)
 (Continued)

(52) U.S. Cl.
 CPC .......... *G06F 17/28* (2013.01); *G06F 16/3331* (2019.01); *G06F 16/367* (2019.01);
 (Continued)

(58) Field of Classification Search
 CPC ............... G06F 16/367; G06F 16/3331; G06F 16/9024; G06F 17/27; G06N 20/00; G06N 5/043; H04L 9/0637; H04L 67/104
 See application file for complete search history.

(56) References Cited

U.S. PATENT DOCUMENTS

| 9,916,536 B2 | 3/2018 | Gordon et al. |
| 9,959,504 B2 | 5/2018 | Gordon et al. |

(Continued)

FOREIGN PATENT DOCUMENTS

| CN | 105095195 | 11/2015 |
| CN | 105843875 | 8/2016 |
| CN | 107015963 | 8/2017 |

OTHER PUBLICATIONS

Bao, Junwei et al., Constraint-Based Question Answering with Knowledge Graph, Proceedings of COLING 2016, the 26th Annual Conference on Computational Linguistics: Technical Papers, pp. 2503-2514, Dec. 2016.

(Continued)

*Primary Examiner* — Nafiz E Hoque
(74) *Attorney, Agent, or Firm* — Lieberman & Brandsdorfer, LLC

(57) ABSTRACT

A system, computer program product, and method are provided to automate a framework for knowledge graph based persistence of data, and to resolve temporal changes and uncertainties in the knowledge graph. Natural language understanding, together with one or more machine learning models (MLMs), is used to extract data from unstructured information, including entities and entity relationships. The extracted data is populated into a knowledge graph. As the KG is subject to change, the KG is used to create new and retrain existing machine learning models (MLMs). Weighting is applied to the populated data in the form of veracity value. Blockchain technology is applied to the populated data to ensure reliability of the data and to provide auditability to assess changes to the data.

18 Claims, 12 Drawing Sheets

(51) Int. Cl.

| | |
|---|---|
| *H04L 9/06* | (2006.01) |
| *H04L 29/08* | (2006.01) |
| *G06N 5/04* | (2006.01) |
| *G06N 20/00* | (2019.01) |
| *G06F 16/36* | (2019.01) |
| *G06F 16/33* | (2019.01) |
| *G06F 16/901* | (2019.01) |

(52) U.S. Cl.
CPC .......... *G06F 16/9024* (2019.01); *G06F 17/27* (2013.01); *G06N 5/043* (2013.01); *G06N 20/00* (2019.01); *H04L 9/0637* (2013.01); *H04L 67/104* (2013.01)

(56) References Cited

U.S. PATENT DOCUMENTS

| | | | |
|---|---|---|---|
| 2015/0324350 A1 | 11/2015 | Bufe, III | |
| 2015/0356410 A1 | 12/2015 | Faith et al. | |
| 2016/0342989 A1 | 11/2016 | Davis | |
| 2017/0091664 A1 | 3/2017 | Sanchez et al. | |
| 2017/0103167 A1* | 4/2017 | Shah | G06F 11/1464 |
| 2017/0161263 A1 | 6/2017 | Gordon et al. | |
| 2017/0161615 A1 | 6/2017 | Gordon et al. | |
| 2018/0032887 A1 | 2/2018 | Gordon et al. | |
| 2018/0129958 A1* | 5/2018 | Saxena | G06Q 20/3825 |
| 2018/0336286 A1* | 11/2018 | Shah | G06Q 10/10 |

OTHER PUBLICATIONS

Anonymous, Learning the users knowledge of subject matter through discourse in a dialogue system, May 2016.

Anonymous, Method to identify new source documents and enlarge corpora in question-answer systems by automated stylistic evaluation of uncurated text, Mar. 2016.

Anonymous, System and Method for Cognitive Alerting for Hearables, Jun. 2017.

Anonymous, Self-diagnosing natural language QA system that improves itself based on facial feature tracking, Jun. 2015.

Anonymous, Improving User Feedback in a Question Answering System for Indirect Answers, Oct. 2014.

List of IBM Patents or Applications Treated as Related, Jan. 2018.

Patent Cooperation Treaty International Search Report and Written Opinion, dated May 29, 2019.

* cited by examiner

MACHINE LEARNING TO INTEGRATE KNOWLEDGE AND NATURAL LANGUAGE PROCESSING

BACKGROUND

The present embodiment(s) relate to natural language processing. More specifically, the embodiment(s) relate to an artificial intelligence platform to convey and utilize recollection in natural language processing.

In the field of artificial intelligent computer systems, natural language systems (such as the IBM Watson™ artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning or new training data that is incorrect.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is not guarantee that the system will extract the same entities as done previously. New models may adversely affect prior model results. Similarly, an error introduced through a document may result in extracting incorrect data and providing the incorrect data as output. Accordingly, there is a need to create deterministic behavior in the cognitive system(s).

SUMMARY

The embodiments include a system, computer program product, and method for natural language processing directed at deterministic data for cognitive systems.

In one aspect, a system is provided with a processing unit operatively coupled to memory, with an artificial intelligence platform in communication with the processing unit and memory. A knowledge engine, which is in communication with the processing unit, is provided to manager data. More specifically, the knowledge engine extracts data and a data relationship from structured and/or unstructured data. The knowledge engine creates an entry for the extracted data and the data relationship in a knowledge graph, and selectively stores the data and data relationship in the knowledge graph, including assignment of a veracity value to the stored data. In addition, an asset value entry is created in a corresponding blockchain (BC) ledger that corresponds to or is otherwise associated with the knowledge graph. The asset value entry includes the assigned veracity value. A BC identifier that corresponds to the BC ledger entry is created, and the BC identifier is stored with the knowledge graph entry. Based on the knowledge graph entry and the corresponding BC ledger entry, select data in the KG may be utilized by the knowledge engine to support an evaluation. More specifically, the evaluation support a determination of provenance of select data, and in addition supports quantifying the data. The knowledge engine generates a list of evaluated data, including a sort of the data in the list based on the assigned veracity value. A data element is returned from the sorted list, which in one embodiment is the data element with the strongest veracity score among data element entries in the list.

In another aspect a computer program product is provided to process natural language. The computer program product includes a computer readable storage device having embodied program code that is executable by a processing unit. Program code is provided to store data in a knowledge graph. This includes program code to extract data and a data relationship from structure and/or unstructured data, program code to create an entry in the knowledge graph, with the entry including selective storage of the extracted data and data relationship and assignment of a veracity value to the stored data, program code to create an asset value entry in a BC ledger that corresponds to the knowledge graph with the entry including the assigned veracity value, program code to create a BC identifier that corresponds to the BC ledger entry, and program code to store the created BC identifier with the knowledge graph entry. In addition, program code is provides to support evaluation of stored data. Specifically, program code evaluates select data stored in the knowledge graph, which includes the program code employing the BC identifier to determine provenance of the select data and to quantify the data. Program code is also provided to generate a list of evaluated data, and to sort the data in the list based on a corresponding veracity value. An outcome is generated from the list in the form of a data element with a strongest represented veracity score in the sorted list.

In yet another aspect, a method is provided for processing natural language. The method includes storing data in a knowledge graph, evaluating the stored data, identifying a data element in the evaluated data. The storing of the data includes: extracting data and a data relationship from structured and/or unstructured data, creating an entry in the knowledge graph and selectively storing the extracted data and data relationship in the graph, assigning a veracity value to the stored data, creating an asset value entry in a corresponding BC ledger, creating a BC identifier, and storing the BC identifier with the knowledge graph entry. The evaluation of the stored data includes employing the BC identifier to determine provenance of the select data and also to quantify the data. Based on the evaluation, a list is generated and sorted based on the assigned veracity value(s). A data element with a strongest identified veracity value is returned from the list.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Ontology functions as a structural framework to organize information and concepts. Natural language understanding (NLU) is a subset of natural language processing (NLP). NLU uses algorithms to transform speech into a structured ontology. In one embodiment, the ontology is constructed from the taxonomy of NLU output. NLU provides the definitions required to construct the ontology in terms of classes, subclasses, domain, range, data properties, and object properties. Ontology individuals are mapped to objects. Processing the same or similar documents provides the data required to build the ontology, also referred to as the initial ontology. The ontology is defined by the Machine Learning Model (MLM) being applied by a knowledge graph (KG) manager to a data store; the ontology is constructed using output of an associated NLP service. More specifically, the ontology is generated with facts or mentions that the MLM has generated. The facts or mentions make up the individuals of the ontology. In one embodiment, the ontology is in the form of a KG with the facts or mentions represented as nodes in the graph. The structure of the KG may be kept constant, while allowing information to be added or removed. Similarly, the ontology may be used to create new and retrain existing MLMs. In one embodiment, when the KG is modified, new entities and relationships are realized and employed to automate training of the MLM; the MLM becomes dynamic and progressive. Accordingly, the ontology as represented by the KG and the MLM are inter-related.

Figure 1:
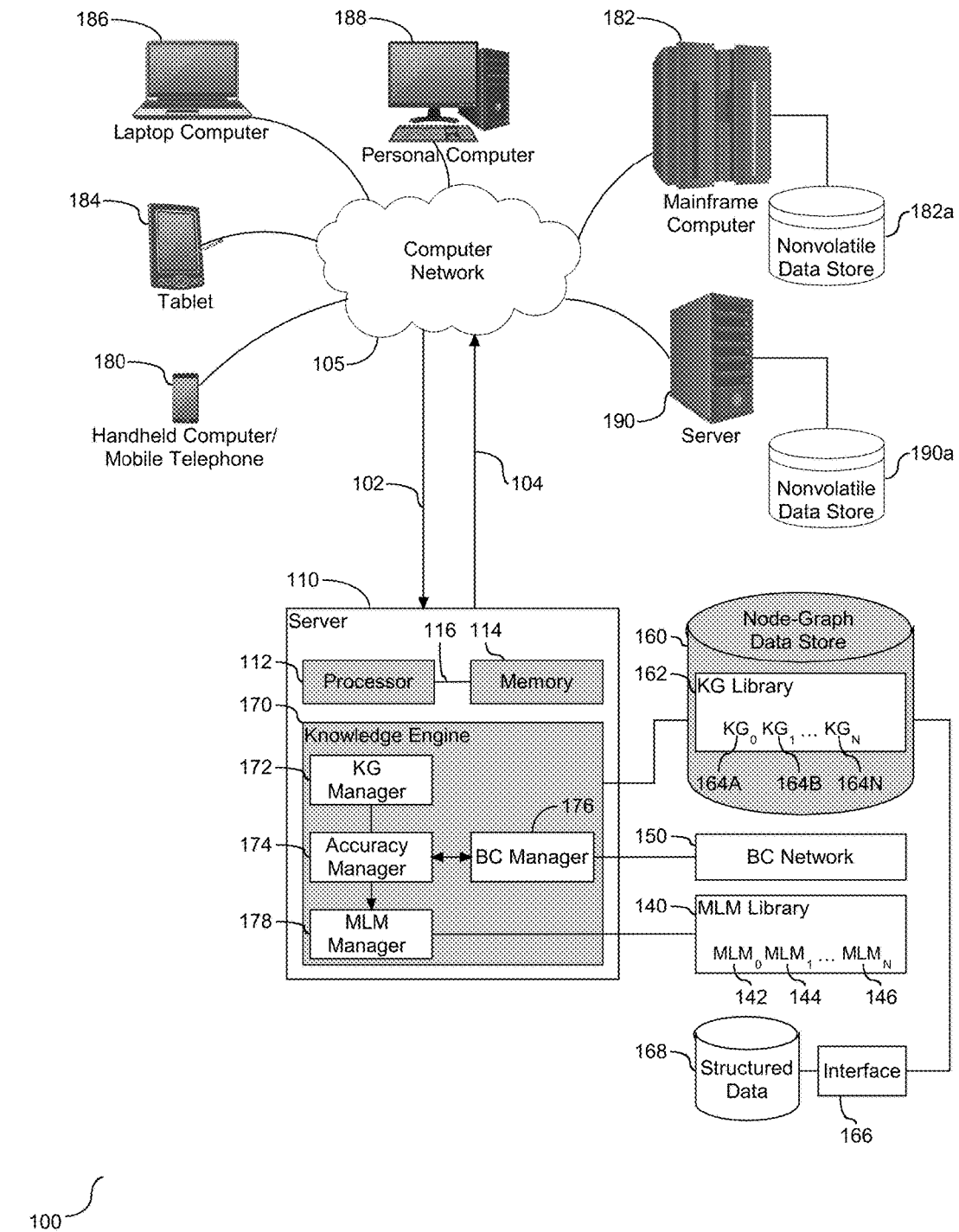
FIG. 1 depicts a system diagram illustrating a schematic diagram of a natural language process system.

Referring to FIG. 1, a schematic diagram of a natural language processing system (100) is depicted. As shown, a server (110) is provided in communication with a plurality of computing devices (180), (182), (184), (186), and (188) across a network connection (105). The server (110) is configured with a processing unit (112) operatively coupled to memory (114) across a bus (116). A tool in the form of a knowledge engine (170) is shown local to the server (110), and operatively coupled to the processing unit (112) and/or memory (114). As shown, the knowledge engine (170) contains one or more tools (172)-(178). The tools (172)-(178) provide natural language processing over the network (105) from one or more computing devices (180), (182), (184), (186) and (188). More specifically, the computing devices (180), (182), (184), (186), and (188) communicate with each other and with other devices or components via one or more wires and/or wireless data communication links, where each communication link may comprise one or more of wires, routers, switches, transmitters, receivers, or the like. In this networked arrangement, the server (110) and the network connection (105) may enable natural language processing and resolution for one or more content users. Other embodiments of the server (110) may be used with components, systems, sub-systems, and/or devices other than those that are depicted herein.

The tools, including the knowledge engine (170), or in one embodiment, the tools embedded therein including the KG manager (172), the accuracy manager (174), the BC manager (176), and the MLM manager (178), may be configured to receive input from various sources, including but not limited to input from the network (105), one or more knowledge graphs from a node-graph data store (160) operatively coupled to a corpus of structured data (168) via an interface (166), a BC network (150), and a library of one or more machine learning models (MLMs) (140). As shown, the node-graph data store (160) functions as a library (162) of knowledge graphs, with a plurality of KGs, including $KG_0$ (164A), $KG_1$ (164B), and $KG_N$ (164N). The quantity of KGs shown herein should not be considered limiting. Each KG is a representation of an ontology of concepts. More specifically, each KG (164A), (164B), and (164N) includes a plurality of related subjects and objects. In one embodiment, related KGs are stored in an associated KG container, with the corpus (160) storing one or more KG containers. In one embodiment, KGs may also be acquired from other sources, and as such, the data store depicted should not be considered limiting.

The various computing devices (180), (182), (184), (186), and (188) in communication with the network (105) demonstrate access points for content creators and content uses. Some of the computing devices may include devices for a database storing the corpus of data as a body of information used by the knowledge engine (170), and in one embodiment the tools (172)-(178), to embed deterministic behavior into the system. The network (105) may include local network connections and remote connections in various embodiments, such that the knowledge engine (170) and the embedded tools (172)-(178) may operate in environments of any size, including local and global, e.g. the Internet. Additionally, the server (110) and the knowledge engine (170) serves as a front-end system that can make available a variety of knowledge extracted from or represented in documents, network accessible sources and/or structured data sources. In this manner, some processes populate the server (110) with the server (110) also including input interfaces to receive requests and respond accordingly. Content creators and content users may also be available in data repositories, such as, but not limited to, (140) and (160), and the list of demonstrated access points here should not be considered limiting.

As shown, the node-graph data store (160) is operatively coupled to the server (110). The node-graph data store (160) includes a KG library (162) with one or more KGs (164A)-(164N) for use by the server (110). Content users may access the system via API administration or orchestration platforms, as shown and described in FIG. 2, and natural language input received via the NLU input path.

As described in detail below, the server (110) and the knowledge engine (170) processes natural language queries through use of one or more machine learning models, hereinafter MLMs, to extract or store content in one or more KGs stored in the node-graph data store (160). Blockchain technology, hereinafter "BC", is leveraged into the content to effectively provide authenticity, e.g. provenance, of stored or received data. The MLM manager (178) functions as a tool, or in one embodiment, an API within the knowledge engine (170), and is used to create, link, and/or modify an associated MLM. As further described below, MLMs are generated, created, or modified specific to a particular knowledge domain. The MLMs are created to extract entities and relationships from unstructured data. These models are specifically created to understand a particular domain of knowledge (e.g. biographical information, stock market, astronomy, etc.).

The BC is represented herein as the BC Network (150) in the form of a decentralized and distributed digital ledger for recording the history of transactions. More specifically, the BC refers to a type of data structure that enables digitally identifying and tracking transactions and sharing this information across a distributed network of computers. The BC effectively creates a distributed trust network via transparently and securely tracking ownership. As shown and described herein, the BC is leveraged together with the MLM manager (178), accuracy manager (174), and KG manager (172) to integrate knowledge with natural language processing.

The server (110) may be the IBM Watson™ system available from International Business Machines Corporation of Armonk, N.Y., which is augmented with the mechanisms of the illustrative embodiments described hereafter. The IBM Watson™ knowledge manager system imports knowledge into natural language processing (NLP). Specifically, as described in detail below, as data is received, organized, and/or stored, the data may be true or false. The server (110) alone cannot differentiate, or more specifically, authenticate the veracity of the data. As shown herein, the server (110) receives input content (102) which it then evaluates to extract features of the content (102) that in turn are then applied to the node-graph data store (160). In particular, received content (102) may be processed by the IBM Watson™ server (110) which performs analysis to evaluate or impart authenticity of the input content (102) using one or more reasoning algorithms.

To process natural language, the server (110) utilizes an information handling system in the form of the knowledge engine (170) and associated tool (172)-(178) to support NLP. Though shown as being embodied in or integrated with the server (110), the information handling system may be implemented in a separate computing system (e.g., 190) that is connected across the network (105) to the server (110). Wherever embodied, one or more MLMs are utilized to manage and process data, and more specifically, to detect and identify natural language and create or utilize deterministic output. As shown, the tools include the KG manager (172), the accuracy manager (174), a BC manager (176) and the MLM manager (178). The MLM manager (178) is shown operatively coupled to an MLM library (140) shown herein with a plurality of MLMs, including $MLM_0$, (142), $MLM_1$ (144), and $MLM_N$ (146), although the quantity of MLMs shown and described should not be considered limiting. It is understood that in one embodiment the MLM is an algorithm employed or adapted to support the NLP. Although shown local to the server (110), tools (170)-(178) may collectively or individually be embedded in memory (114).

One or more MLMs (142)-(146) function to manage data, including store data in a KG. As understood, a KG is a structured ontology and does not merely store data. Specifically, the knowledge engine (170) extracts data and one or more data relationships from unstructured data, creates an entry for the extracted data and data relationship(s) in a KG, and stores the data and data relationship(s) in the KG entry. In one embodiment, data in the KG is stored or represented in a node and a relationship between two data elements is represented as an edge connecting two nodes. Similarly, in one embodiment, each node has a node level veracity value and each relationship has a relationship veracity value, with the relationship veracity value calculated based on the veracity values of the two inter-connected nodes. In addition to the data extraction and storage, the MLM(s), $MLM_0$, (142) assigns or otherwise designates a veracity value to the data stored in the KG. In one embodiment, the veracity value is a composite score comprised of staunchness, source reliability, and human feedback, as described in detail below. In one embodiment, the veracity value may include additional factors or a subset of the factors, and as such, should not be considered limiting. The assigned veracity value is stored in the KG. The assigned veracity value is also stored in an entry in the identified BC ledger. Each entry in the BC ledger has a corresponding identifier, referred to herein as a BC identifier, which identifies the ledger and address of the ledger entry. The BC identifier is stored in the KG with the identified data and identifies the corresponding BC ledger and location of the stored veracity value. In one embodiment, the KG manager (172) manages storage of the BC identifier in the KG. Accordingly, the assigned or created veracity value is stored in the BC and is a duplicated copy of the veracity values in the KG in the node-graph data store (160).

It is understood that each KG organizes and provides structure to large quantities of data. A KG may be a single ontology, or in one embodiment, a KG or a KG container may be comprised of a plurality of KGs that are linked together to demonstrate their relationship or association. The KG manager (172) functions to manage structure and organization of the KGs. For example, a large KG may be too cumbersome or expensive to manage. In this scenario, the KG manager (172) may partition the KG, effectively creating at least two partitions, e.g. a first KG partition and a second KG partition. The KG may be partitioned based on one or more factors. For example, in one embodiment, the KG may be partitioned by topics or sub-topics. Similarly, each fact represented in the KG has an associated veracity value that is a composite of a plurality of factors, including but not limited to a staunchness indicator, a source reliability measure, and a human feedback factor. The KG manager (172) may partition the KG based upon the veracity value, or in one embodiment, based on one or more of the factors that comprise the veracity value. In one embodiment, after the KG has been partitioned into at least a first and a second partition, the KG manager (172) may designate one or more of the components of the veracity value to each node or edge represented in the partition. For example, following the KG partitioning, the KG manager (172) may populate and assign a first reliability value to data in the first partition, and in one embodiment, the KG manager (172) may further populate and assign a second reliability value, different than the first reliability value, to data in the second partition. Modification of one or more of the components of the veracity value effectively changes the veracity value. However, it is understood that the values of one or more of the components of the veracity value may change over time, and as such, this change is reflected or embodied with the associated data. Accordingly, the KG manager (172) functions to manage data and provide structure and value to the data.

One of the functions of the KG manager (172) is to link or join two or more KGs. Joining or linking KGs is the inverse of partitioning a KG. The functionality of joining or linking KGs requires the KG manager (172) to compare one or more data elements in one KG with one or more data elements in a second KG and to eliminate or at least reduce the appearance of duplicate data. As articulated above, each data element represented in the KG has an associated composite score. The KG manager (172) may use one component, multiple components, or the veracity value itself as a factor for the data comparison and evaluation. Once joined or linked, it may be feasible or warranted to remove duplicate data items. Data in the linked KGs determined to be duplicate data is selectively removed by the KG manager (172). One characteristic of removing duplicate data is the ability to maintain a constant structure of the KG. Accordingly, the KG manager (172) functions to manage the structure of the KG by managing the data represented in the KG.

The BC manager (176) has multiple functions with respect to the machine learning environment. As described above, the BC manager (176) may function with the MLM(s) to maintain the authenticity of the associated data. The BC manager (176) produces contracts for BC network interactions, provides provenance, retrieves BC information, and manages all BC interactions for the system.

The evaluation of the NL input is managed by the MLM, $MLM_0$, (142). A conflict or error associated with the NL input is identified by query results from the KG generated from the NL input, and more specifically the sorting of the query results. When there is a conflict between the query results and the NL input, with the query results having a strong veracity value, it is an indication that the NL input may be incorrect. The accuracy manager (174) corrects the NL input by replacing the language of the NL input with an identified or selected triplet from the generated list. The triplet, also referred to herein as memory, is based on two or more nodes in the KG and a relationship between the two or more nodes. In one embodiment, the triplet is a subject-verb-object relationship as captured from the KG. In one embodiment, the identification or selection may be based on the highest veracity value, which in one embodiment is selected by the user. Similarly, in another embodiment, the identification or selection may be based on one or more of the factors that comprise the composite veracity value. Another form of a conflict may arise when the knowledge engine (150) identifies an immutable factor associated with one or more entries in the list and further identifies a conflict between the immutable factor and the NL input. This conflict is resolved by the accuracy manager (174) correcting the NL input with a replacement of the language of the NL input with the triplet associated with the entry having the immutable factor. In addition to a conflict, another resolution may be in the accuracy manager (174) identifying a partial match between the NL input with the sorted list entries. The partial match enables or directs the KG manager (172) and the BC manager (176) to create a new entry in the KG and a corresponding BC ledger, respectively, for the NL input. In addition, the KG manager (172) connects the new entry and the existing KG entry corresponding to the partial match. It is further understood that the NL input may not generate any matches, e.g. empty set. If there is no match, the KG manager (172) and the BC manager (176) create a new KG entry and BC ledger entry, respectively, corresponding to the NL input. Accordingly, NL input is processed by the MLM, $MLM_0$, (142), and in one embodiment the accuracy manager (174), in view of the data organized in the KG(s).

As shown and described herein, an MLM library (140) is operatively coupled to the server (110) and contains a plurality of MLMs to support natural language processing in the AI platform. One or more of the MLMs may be dynamic and trained to adapt to new entities and relationships. Different KGs may be associated with different knowledge domains. For example, a first MLM, $MLM_0$ (142), may be identified or selected from the library (140) based on its alignment with $KG_0$ (164A). In response to processing NL input, $MLM_0$ (142) may be applied against $KG_0$ (164A) and separately applied against a second KG, $KG_1$ (164B). The MLM manager (178) processes results from both KGs together with their corresponding veracity values, and based on the processing, a modification of one of the KGs is identified. In one embodiment, the veracity values are evaluated to identify the authenticity of the modification. Subject to the authentication, the MLM manager (178) dynamically modifies the associated MLM, $MLM_0$ (142). In one embodiment, the identified modification may be an expansion of the associated data set to include an additional field. Similarly, in one embodiment, the MLM manager (178) may ascertain that the modification is synchronic or diachronic, and use this classification as an element to oversee the modification. In one embodiment, the modification of $MLM_0$ (142) results in creation of a new MLM, e.g. $MLM_N$ (146), and in one embodiment retention of the original MLM, $MLM_0$ (142). Accordingly, the MLM library (140) may expand subject to the dynamic modification of the MLMs.

Types of information handling systems that can utilize system (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include pen or tablet computer (184), laptop or notebook computer (186), personal computer system (188) and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
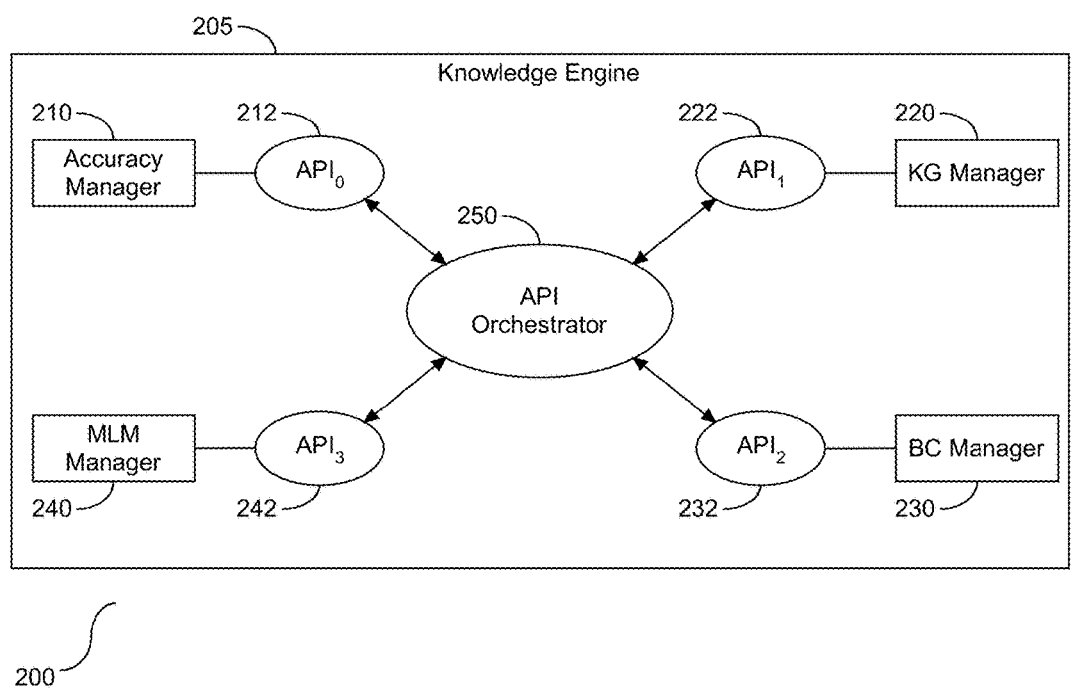
FIG. 2 depicts a block diagram a block diagram is provided illustrating the NL processing tools shown in FIG. 1 and their associated APIs.

An Application Program Interface (API) is understood in the art as a software intermediary between two or more applications. With respect NL processing system shown and described in FIG. 1, one or more APIs may be utilized to support one or more of the tools (172)-(178) and their associated functionality. Referring to FIG. 2, a block diagram (200) is provided illustrating the NL processing tools and their associated APIs. As shown, a plurality of tools are embedded within the knowledge engine (205), with the tools including the accuracy manager (210) associated with $API_0$ (212), the KG manager (220) associated with $API_1$ (222), the BC manager (230) associated with $API_2$ (232), and the MLM manager (240) associated with $API_3$ (242). Each of the APIs may be implemented in one or more languages and interface specifications. $API_0$ (212) provides for asset comparison, veracity determination, veracity decision, and veracity assignments; $API_1$ (222) provides for KG creation, update, and deletion; $API_2$ (232) provides MLM creation, update and deletion; and $API_3$ (242) provides for BC contract creation, block creation, network communication, and block addition. As shown, each of the APIs (212), (222), (232), and (242) are operatively coupled to an API orchestrator (250), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
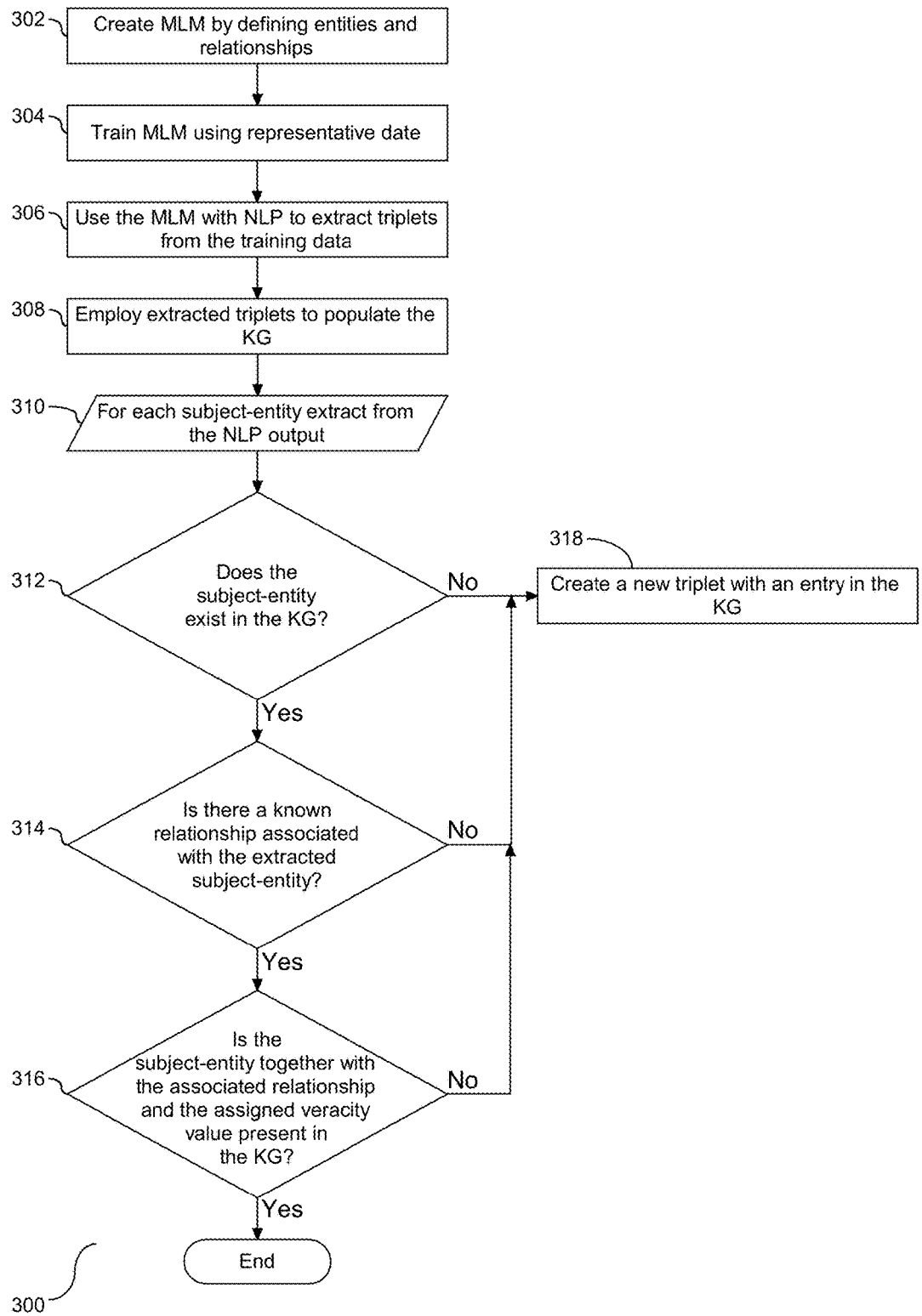
FIG. 3 depicts a flow chart illustrating a process for populating a knowledge graph (KG) from natural language (NL) output of a natural language processing (NLP) system.

To provide additional details for an improved understanding of selected embodiments of the present disclosure, reference is now made to FIG. 3 which illustrates a process in a form for initializing a KG. When a system is initialized, the KG is empty. MLMs are created or utilized to extract entities and relationships from unstructured data. The MLMs are created to understand a particular domain of knowledge, i.e. biographical information, financial market, fields of science, etc. Representative data is used to teach the system to identify the text of the entities and relationships defined in the model. Referring to FIG. 3, a flow chart (300) is provided illustrating a process for populating a KG from natural language output of an NLP system. As part of the KG initialization and population process, veracity values for the extracted triplets are specified. The veracity value is comprised of a staunchness indicator, a source reliability indicator, and a human feedback indicator. In one embodiment, each of the indicators that comprise the veracity value is a numerical value on a scale between 0 and 1. The staunchness indicator reflects certainty of an underlying fact. In one embodiment, a staunchness value of 1 reflects that the fact is definitely true, a value of 0 reflects that the fact is definitely false, and a value between 0 and 1 indicates a level of certainty or uncertainty about the fact. The source reliability factor is associated with the source, e.g. origin, of the fact, including but not limited to, data and time a fact was ascertained. The human feedback indicator tracks the quantity of affirmations and refutations of a fact. In one embodiment, this factor tracks the quantity of responses. Accordingly, as the KG is initialized and populated with data, the components of the veracity value are selected or set to be assigned to the triplets extracted via the NLP system.

Classification, such as synchronic and diachronic information, is employed to describe data that either stays constant or can change over time, respectively. In the case of an example of supervised training, the staunchness value is set to 1, the source reliability value is set to 1, and the human feedback is set to 0. These values are merely an example, and in one embodiment may vary. In one embodiment, a KG application program interface (API) provides a platform to specify the veracity values. As shown, an MLM is created by defining entities and relationships (302). The MLM is trained using representative data (304). Following step (304), the MLM is used with NLP to extract triplets from the training data (306). The extracted triplet may be saved to a file or streamed. In one embodiment, the extracted triplet is a subject-verb-object relationship. Following step (306), the extracted triplets are employed to populate the KG (308). In one embodiment, the KG API is used to read and parse out the triplets from the NLU output. In one embodiment, the triplets populated into the KG are referred to as memories. The MLM is created through training, after which the MLM is applied against data to populate the KG. Accordingly, the MLM together with the NLP extract triplets from data and populate a previously empty KG.

For each subject-entity extracted from the NLP output (310), it is determined if the subject-entity exists in the associated KG (312). A positive response to the determination at step (312) is followed by determining if there is a known relationship associated with the extracted subject-entity (314). If the response to the determination at step (314) is affirmative, then it is determined if the subject-entity together with the associated relationship and the assigned veracity value is presented in the KG (316). A positive response to the determination at step (316) is an indication that the subject-entity relationship is present in the KG, and the process concludes. However, a negative response to any one of the determinations shown at steps (312), (314), and (316), is followed by the creation of a new triplet and an entry of the new triplet in the KG (318). Accordingly, as shown, the MLM is employed to extract data from an NLP document and to access the KG manager to selectively populate the KG with the extracted data.

Figure 4:
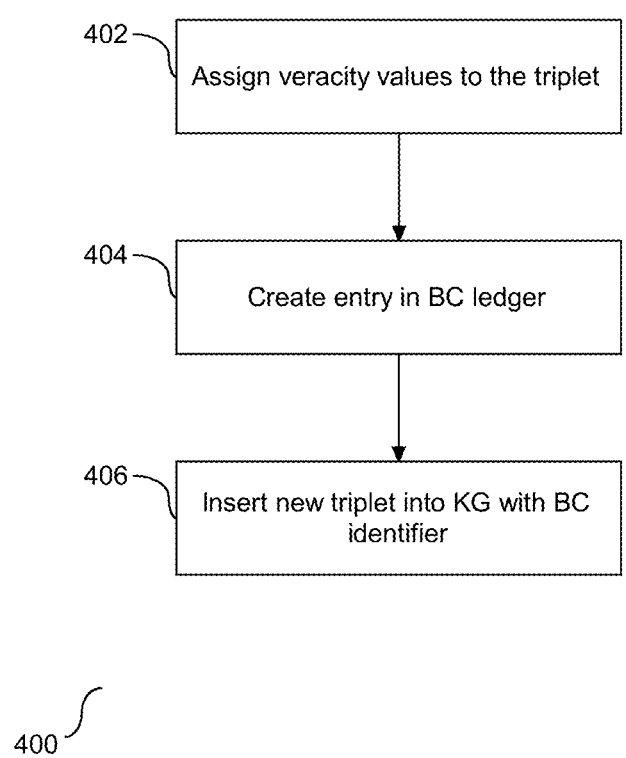
FIG. 4 depicts a flow chart illustrating a process for creating a new triplet from extracted data.

Referring to FIG. 4, a flow chart (400) is provided illustrating a process for creating a new triplet from the extracted data. As described in FIG. 3, the veracity value components of the extracted data are established or assigned. In one embodiment, the veracity value components are established based on the supervision associated with the KG initialization. For each new triplet, e.g. subject-verb-object relationship, the veracity values are assigned to the triplet (402). In one embodiment, the veracity values are assigned via the KG API. Following step (402), an entry is created in a corresponding or designated BC ledger (404). More specifically, at step (404), the BC entry stores the triplet veracity values and an identifier, referred to herein as a BC identifier, is created and thereafter retrieved. In one embodiment, the retrieved BC identifier is a uniform resource identifier (URI) or other unique asset identifier. Following step (404), the new triplet is inserted into the KG together with the associated BC identifier (406). In one embodiment, the KG API implements the insertion of the triplet and the associated BC identifier at step (406). Accordingly, as demonstrated, the veracity values of each new triplet are stored in a corresponding BC ledger, and an associated BC identifier is stored or otherwise associated with the triplet in the KG entry.

The processes shown and described in FIGS. 3 and 4 may also be employed for populating a KG from natural language output of an NLP system using unsupervised training, e.g. the data may be unreliable, or using supervised training. As shown and described in FIGS. 3 and 4, the KG API is utilized to set the veracity values for the data being extracted from the NLP output. Depending on the source, the veracity values can be set to indicate uncertainty For example, in one embodiment, the staunchness indicator may be set to 0.5, the source reliability may be set to 0.5, and the human feedback value may be set to 0. Accordingly, the unsupervised training may be reflected in a different set of veracity values.

In the course of processing non-training data, if an exact triplet match is not found, a new memory is created and stored in the corresponding or identified KG. This can be realized when considering the processing of multiple documents on the same subject. For example, one document may identify a fact with a first date, and a second document may identify the same fact with a second date. However, only one of the dates is factually correct. As shown in FIGS. 3 and 4, each triplet entered into the KG has a corresponding veracity value, which functions as an indicator of correctness of the stored memory. These veracity scores may be used to establish accuracy and/or correctness of conflicting facts populated into the KG.

Figure 5A:
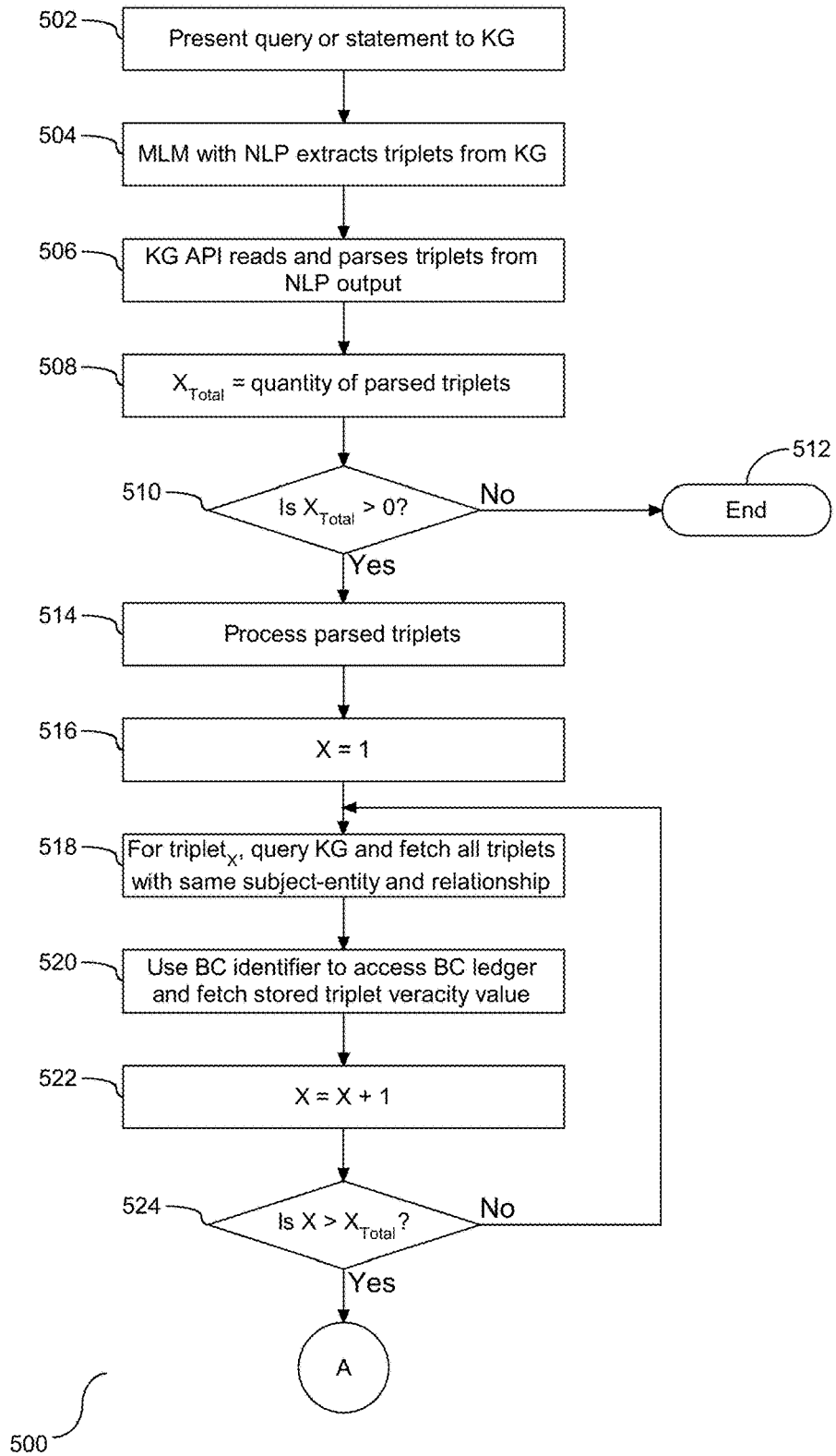
FIGS. 5A and 5B depict a flow chart illustrating a process for extracting triplets from NLP output.
Figure 5B:
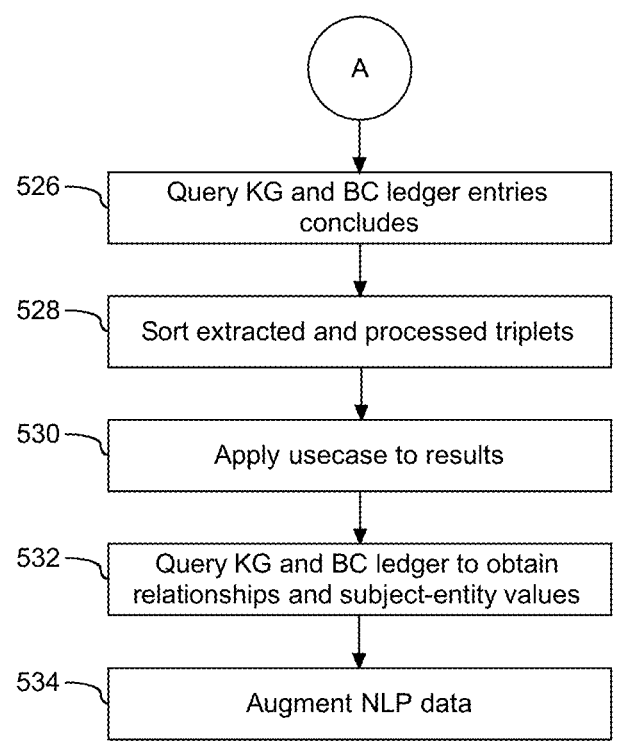

Referring to FIGS. 5A and 5B, a flow chart (500) is provided illustrating a process for extracting triplets from the NLP output. As shown, a query or statement is presented to the KG (502) through the accuracy manager. The presentation may be for a variety of reasons, including but not limited to, fact checking. The MLM is used with NLP to extract triplets from the KG (504), and the KG API is used to read and parse out triplets from the NLP output (506). The following table illustrate an example triplet:

TABLE 1

| Subject-Entity | Relationship | Subject-Entity-Value |
|---|---|---|
| George Washington | Born On | Feb. 22, 1832 |

Following step (506), the variable $X_{Total}$ is assigned to the quantity of parsed triplets (508). It is then determined if $X_{Total}$ is greater than zero (510). A negative response to the determination at step (510) concludes the extraction process (512), since this is an indication that the query produced an empty set. However, a positive response to the determination at step (510) is followed by processing the parsed triplet(s) (514). The triplet counting variable is set to one (516), and for each triplet$_X$ the KG is queried to fetch all triplets with the same subject-entity and relationship (518). As shown and described in FIGS. 3 and 4, each triplet has an associated BC identifier. The BC identifier is utilized to access the corresponding BC ledger and fetch the stored triplet veracity value (520). Following step (520), the triplet counting variable is incremented (522). It is then determined if each of the identified triplets has been processed (527). A negative response to the determination at step (522) is followed by a return to step (518). Similarly, a positive response to the determination concludes the process of querying the KG and the corresponding BC ledger entries (526), and the extracted and processed triplets are subject to a sort (528). The sort at (528) functions to place the triplets into an order. For example, in one embodiment, the triplets may be sorted in ascending order by the staunchness indicator, source reliability, and human feedback. Similarly, the sort order may be customizable to accommodate specific use cases. For example, in one embodiment, the human feedback indicator may be prioritized. Accordingly, the triplet extraction utilizes the KG to obtain or identify the triplet and associated BC identifier, which is utilized to acquire the associated veracity values, which are then employed as a characteristic for sorting the triplets.

The following table, Table 2, is an expansion of Table 1, showing an example sort of two triplets:

TABLE 2

| Subject-Entity | Relationship | Subject-Entity Value | Staunchness Indicator | Source Reliability Indicator | Human Feedback Indicator |
|---|---|---|---|---|---|
| George Washington | Born On | Feb. 22, 1732 | 1.0 | 1.0 | 0 |
| George Washington | Born On | Feb. 22, 1832 | 0.5 | 0.5 | 0 |

In the example of Table 2, there are two triplet entries, each associated with a different subject-entity value. As shown, the entries are sorted in ascending order by either the staunchness indicator or the source reliability indicator. The sorting factor should not be considered limiting. In one embodiment, the sorting may be inverted and in descending order, or based on a different component of the veracity value. The first triplet entry in this example is defined by the subject entity and the relationship is considered to have the greatest veracity value, e.g. veracity score.

The business use case drives the interpretation of the query results. For example, if a triplet with a higher confidence score is realized, the system can be configured to automatically replace the original value of the subject entity value with a value that has a higher veracity score. A staunchness indicator is a reflection of the accuracy of the returned information. As shown, following step (528), the business use case is applied to the search results (530). The application at step (530) is followed by querying both the KG and the appropriate or identified BC ledgers (532) associated with the corresponding BC identifiers in the KG. The query at step (532) obtains all associated relationships and subject-entity values. More specifically, this enables an analytical review of all data for a subject-entity. Following step (532), the NLP input or output data is augmented (534). Examples of the augmentation include, but are not limited to: correction, analysis, augmentation, and masking. Correction includes replacing a subject entity value with data from memory. In one embodiment, the replacement is local, e.g. against the query, and is not reflected in the KG or the BC. Analysis includes addition of a list of subject-relation-values with veracity. Augmentation includes supplementing results with all known subject-relation values that have the highest level of confidence, e.g. one value per subject-relationship pair. Masking includes deletion of one or more triplets from the NLP output. Following step (532), the augmented data is returned. Accordingly, different use cases are optionally available to drive the interpretation of the search results, which may also be augmented, to return one or more appropriate data element from the NLP input.

As shown and described in FIGS. 5A and 5B, one or more queries may be processed against a created KG. It is understood that the KGs function as a tool to organize data, with each triplet reflected in the graph represented or otherwise associated with the veracity score components, e.g. staunchness, reliability, and feedback. It is understood that one or more of the veracity score components may be dynamic, e.g. the values are subject to change over time. This change may be uniform throughout a select KG, thereby affecting each triplet represented in the KG, or the change may be non-uniform and selectively affecting one or more triplets in the KG.

Figure 6:
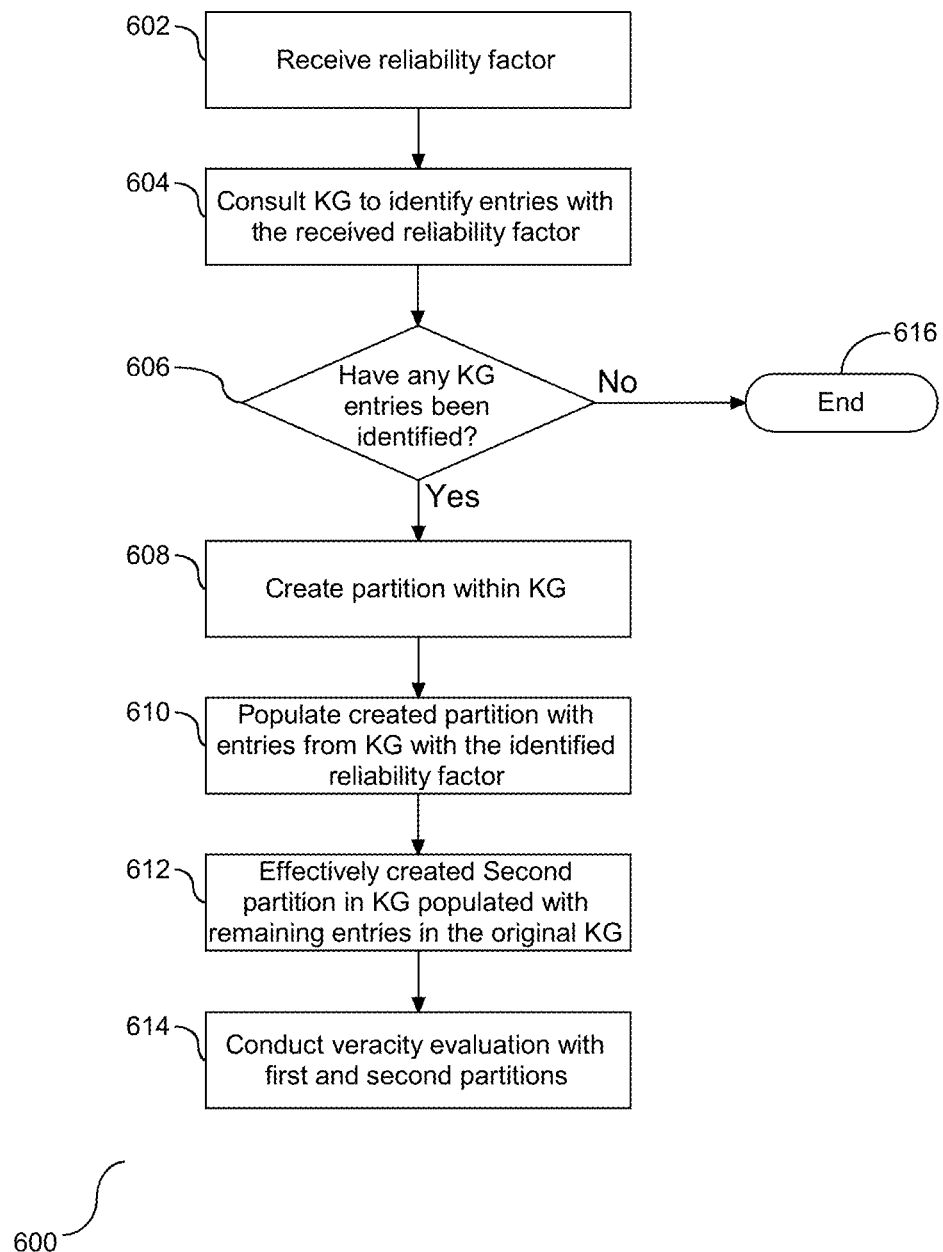
FIG. 6 depicts a flow chart illustrating a process for partitioning a KG.

Referring to FIG. 6, a flow chart (600) is provided illustrating a process for partitioning one or more KGs. The example of the partitioning shown herein is based on a change in a reliability factor. This is merely an example, and in one embodiment the partitioning may be based on a change of the staunchness or feedback factors. The reliability factor reflects a measurement of the reliability of the source of the data. A reliability factor value is received (602). In one embodiment, the reliability factor value is part of the NL input and feedback through the KG API. The KG is consulted to identify entries associated with the received reliability value (604). It is then determined if any KG entries have been identified (606). A negative response to the determination at step (606) concludes the partitioning process since there is no basis for subjecting the KG based on the received reliability factor (616). However, a positive response to the determination at step (606) is following by creating a partition within the KG (608) and populating the created partition with the entries in the KG with the identified reliability value (610). The partition creation at step (608) effectively creates a second partition (612) populated with the remaining entries in the original KG.

It is understood that the entries in the first and second partitions of the KG have different reliability factor values. As described above, the veracity value functions as a composite of the staunchness, reliability, and feedback values. A change in any of the individual component values has an effect on the composite, which may affect any query results. Following step (612), a veracity evaluation within the KG, including the first and second partitions, takes place (614). The evaluation at step (614) includes a comparison of data populated in the first KG partition, e.g. first data, with data populated in the second partition, e.g. second data. In one embodiment, the veracity evaluation is automatically performed after the partitioning. It is understood that data populated in the first partition will have a different veracity value than the data in the second partition. The partitioning shown herein is based on a change of one component represented in the veracity value. In one embodiment, the partitioning may take place on two or more veracity value components or changes to the components. Accordingly, a change in any one of the components that comprise the veracity value may include creation of one or more partitions of the associated KG.

Figure 7:
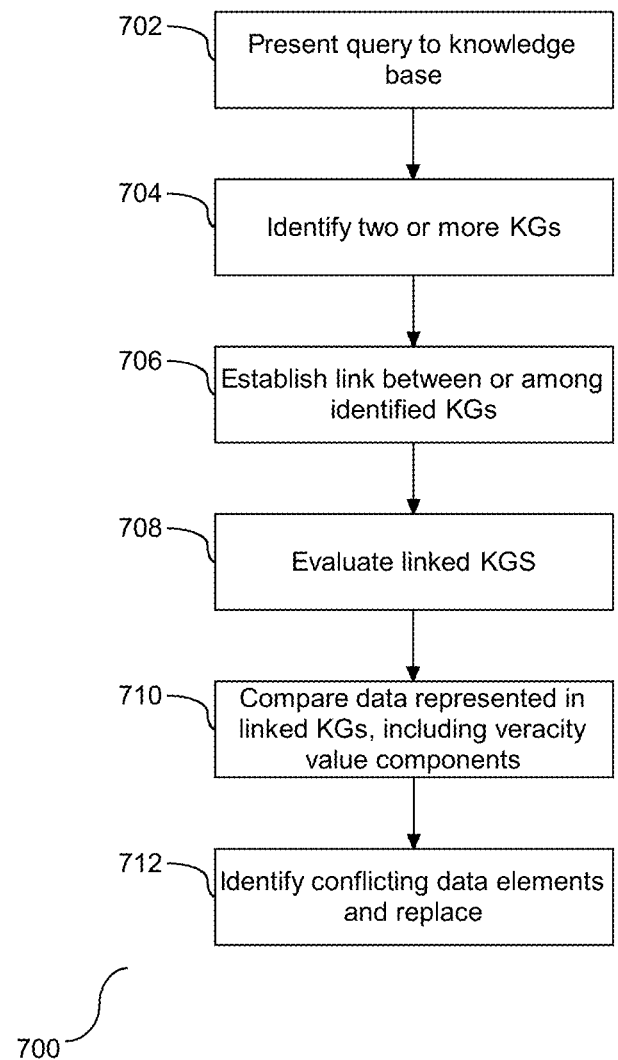
FIG. 7 depicts a flow chart illustrating a process for linking two KGs.

As shown in FIG. 6, a KG may be subject to partitioning. An inverse concept may take place by linking or otherwise joining two or more KGs and associated BC ledger(s). Referring to FIG. 7, a flow chart (700) is provided illustrating a process for linking two KGs and the associated BC ledger(s). In one embodiment, KGs that are at least tangentially related may be linked. The relationship may be based on content or relationships represented in the KGs. As shown, a query is presented to a knowledge base (702), and two or more KGs are identified (704). In one embodiment, the KG API identifies that the two KGs contain data that are relevant to the query. Similarly, in one embodiment, the KG API may identify more than two KGs, and as such, the quantity of identified KGs should not be considered limiting. A link is established between or among the identified KGs (706). The linking of two or more KGs maintains the structure of the separate KGs, i.e. the structures remain constant.

It is understood that the relationship between the KGs, and specifically, the data represented therein may provide query results with conflicting triplets, e.g. memories. To resolve the potential conflicts, an evaluation of the linked KGs is conducted to compare data elements (708). More specifically, the comparison includes an evaluation of data represented in each of the linked KGs (710), including their corresponding veracity value components. Identified conflicting data elements are selectively replaced based on at least one of the veracity value components (712), e.g. staunchness, reliability, and feedback. The replacement follows the structure of the separate KGs. In other words, nodes in the KGs are not removed or added with the linking. Rather the data represented in the identified nodes may be replaced. Accordingly, the replacement of conflicting entries in the linked KGs mitigates conflicting query results.

Figure 8A:
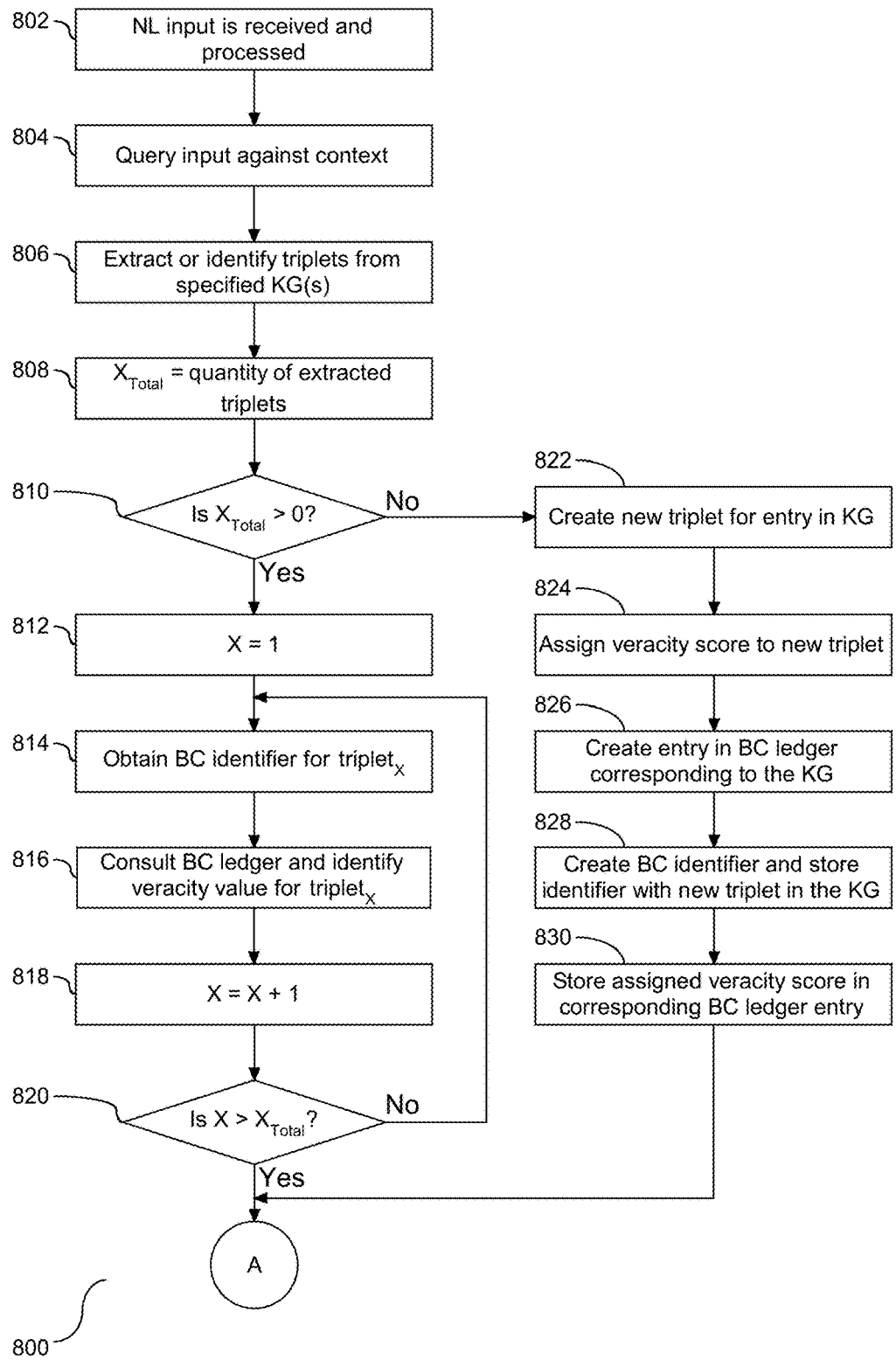
FIGS. 8A and 8B depict a flow chart illustrating a process for leveraging a machine learning model (MLM) to augment the query input.
Figure 8B:
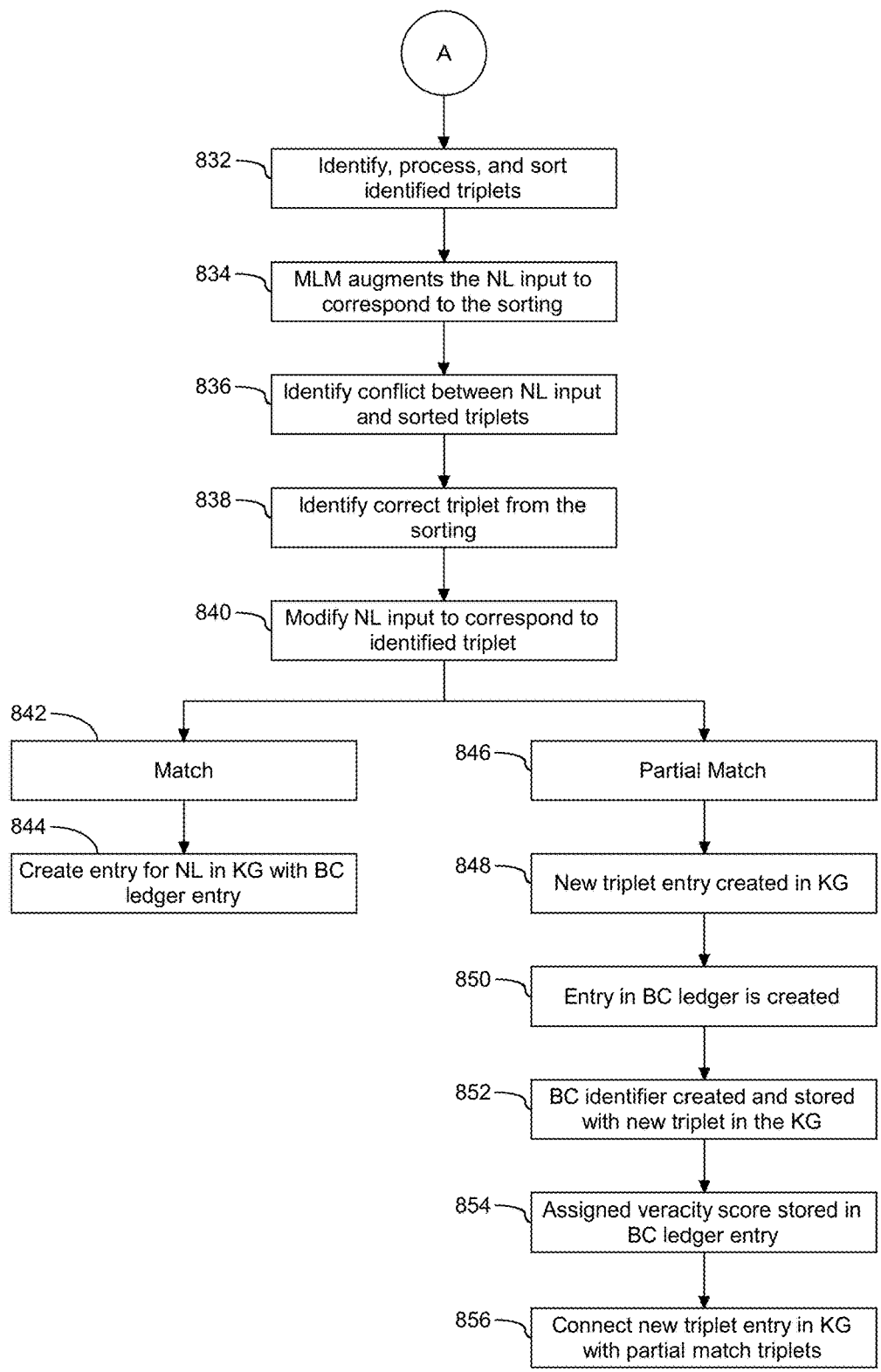

Referring to FIGS. 8A and 8B, a flow chart (800) is provided illustrating leveraging the MLM to augment the query input. More specifically, the results of the query submission may indicate an error directed at the query input. As shown, natural language input is received and processed (802). The received input is queried against context (804), including one or more specified KGs, and in one embodiment, a corresponding BC ledger. The query processing produces results in the form of one or more triplets, e.g. memories, which are extracted or identified from the specified KG(s) (806). As described above, each triplet includes a subject, object, and an associated relationship. The variable $X_{Total}$ is assigned to the quantity of triplets extracted or identified from the KG (808). It is then determined if the quantity extracted at step (808) includes at least one triplet (810). A positive response to the determination at step (810) is followed by initializing an associated triplet counting variable (812). Each triplet has a BC identifier that corresponds to a BC ledger entry, which includes the veracity values associated with or assigned to the triplet. For each extracted or identified triplet, e.g. $triplet_X$, the BC identifier is obtained (814), from which the BC ledger is consulted and the corresponding veracity value is identified (816). Following step (816) the triplet counting variable is incremented (818), and an assessment is conducted to determine if each of the extracted or identified KGs have been evaluated (820). A negative response to the determination at step (820) is followed by a return to step (814), and a positive response concludes the triplet extraction and identified process. Accordingly, for each triplet determined to be associated with the query input, the associated veracity values are identified.

A negative response to the determination at step (810) is followed by creating a new triplet for entry in the associated KG (822). The new triplet corresponds to the received natural language input, e.g. query submission, and a veracity score is assigned to the new triplet (824). In addition, an entry in a BC ledger corresponding to the KG is created (826). A BC identifier associated with the BC ledger entry is created and stored with the new triplet in the KG (828) and the assigned veracity score is stored in the corresponding ledger entry (830). Accordingly, an empty set of triplets returned from the query input results in an addition to the KG and the corresponding BC ledger.

It is understood that the query submission may return a response in the form of one or more triplets from the associated KG, as identified by a positive response to the determination at step (820). After the identified triplets have been processed and sorted (832), the MLM augments the natural language input to correspond to the sorting of the identified triplets (834). The augmentation may take one or more forms. For example, in one embodiment, the augmentation arises from a conflict between the natural language input and the sorted triplets (836). When the conflict is identified, the augmentation by the MLM is in the form of identification of the correct triplet from the sorting (838), and modifying the NL input to correspond to the identified triplet (840). The identification at step (838) may take on different forms. For example, in one embodiment, the identification may be based on the associated veracity values, which as described above is a composite score. Similarly, in one embodiment, one or more of the components that comprise the veracity value may be employed as a sorting factor to sort the list of triplets. In another embodiment, the sort may be based on an immutable factor associated with the triplet entries, sorting the triplets based on the immutable factor. Accordingly, the augmentation may be based on an identified conflict.

It is understood that the augmentation may take on other forms in response to a match or, in one embodiment, a partial match. When the augmentation arises from a match between the natural language input and at least one of the triplets in the sorting (842), an entry for the natural language input is created in the corresponding KG, together with the BC ledger entry (844). Similarly, when the augmentation arises from a partial match between the natural language input (846) and at least one of the identified triplets, a new triplet for entry in the associated KG is created (848). The new triplet corresponds to the received NL input, e.g. query submission, and a veracity score is assigned to the new triplet (848). In addition, an entry in a BC ledger corresponding to the KG is created (850). A BC identifier associated with the BC ledger entry is created and stored with the new triplet in the KG (852) and the assigned veracity score is stored in the corresponding ledger entry (854). In addition, the new triplet entry in the KG is connected with triplet(s) identified with the partial match (856). Accordingly, as demonstrated, the augmentation for a match or partial match includes creation of an entry in the corresponding KG and the associated BC ledger.

As shown and described in FIGS. 3-8B, the MLM is employed to support natural language processing in the form of a query submission to identify data stored in a KG, and in one embodiment to augment the query submission. It is also understood that the MLMs are dynamic and subject to change. The KG may be utilized to create one or more new MLMs, and/or to retrain an existing MLM. When the ontology is modified, new entities and relationships are realized. This new information may then be utilized to automate training of the MLM, thereby support a dynamic and progressive MLM, create a new MLM, or augment an existing MLM.

Figure 9:
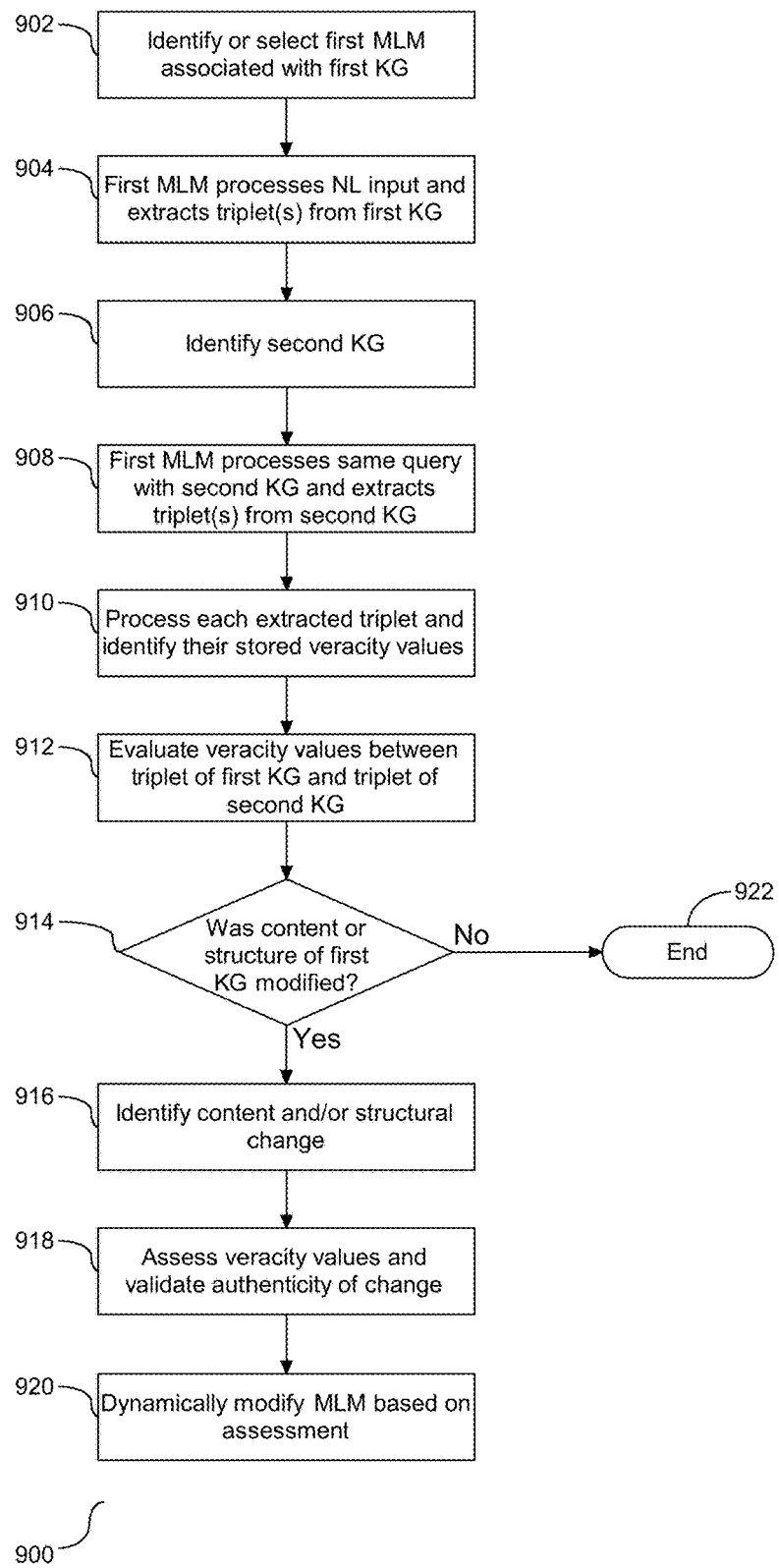
FIG. 9 depicts a flow chart illustrating a process for training an existing MLM.

Referring to FIG. 9, a flow chart (900) provides a process for training an existing MLM. In the process shown herein there is an NLP library of MLMs. An MLM, referred to herein as a first MLM, within the library is identified or selected based on its alignment to a knowledge domain expressed in a KG, referred to herein as a first KG, (902). In response to receipt of natural language input that is queried against the first KG, the identified or selected first MLM processes the query input and extracts one or more triplets from the first KG (904). Additionally, a second KG is identified (906), and in one embodiment is related to the first KG. The MLM processes the same query with the second KG and one or more triplets are extracted from the second KG (908). Each triplet extracted at steps (904) and (908) are also referred to herein as memories, and include a subject, object, and a relationship. As discussed above, each triplet has an associated BC identifier that indicates the BC ledger that stores the corresponding veracity value(s). Following step (908), each extracted triplet is processed to identify their associated veracity value stored in their corresponding BC ledger entry (910). The triplet of the first KG and the triplet of the second KG are evaluated and compared (912). More specifically, the evaluation at step (912) assesses if the content and/or structure of the first KG was subject to a modification, as reflected in the second KG (914). For a MLM to be dynamically modified, the determination is if the two subject KGs have related structure and content. The modification may be evidenced via comparison of the triplets returned from the first and second KGs. A negative response to the evaluation at step (914) concludes the MLM modification (922). However, a positive response to the evaluation at step (914) is followed by identification of the content and/or structural change (916). In addition, the corresponding veracity values are assessed to validate the authenticity of the change(s) (918). Based on the validation at step (918), the structure of the MLM is subject to dynamic modification (920).

The modification at step (920) may take different forms. For example, in one embodiment, the modification of the MLM may conform to the validated change(s) reflected in the second KG entry as compared to the first KG entry. In another embodiment, the modification may be based on an assessment of the corresponding veracity values of the extracted data. Accordingly, the MLM is demonstrated to be subject to change based upon changes in the KGs.

Furthermore, it is understood that data and associated relationships represented in the KGs may be synchronic or diachronic information. The classification may be imported into the evaluation at step (912). Data that should not change and is demonstrated to have been modified should not be reflected in an MLM modification. Accordingly, the data classification may be imported into the data evaluation and associated MLM evaluation.

Figure 10:
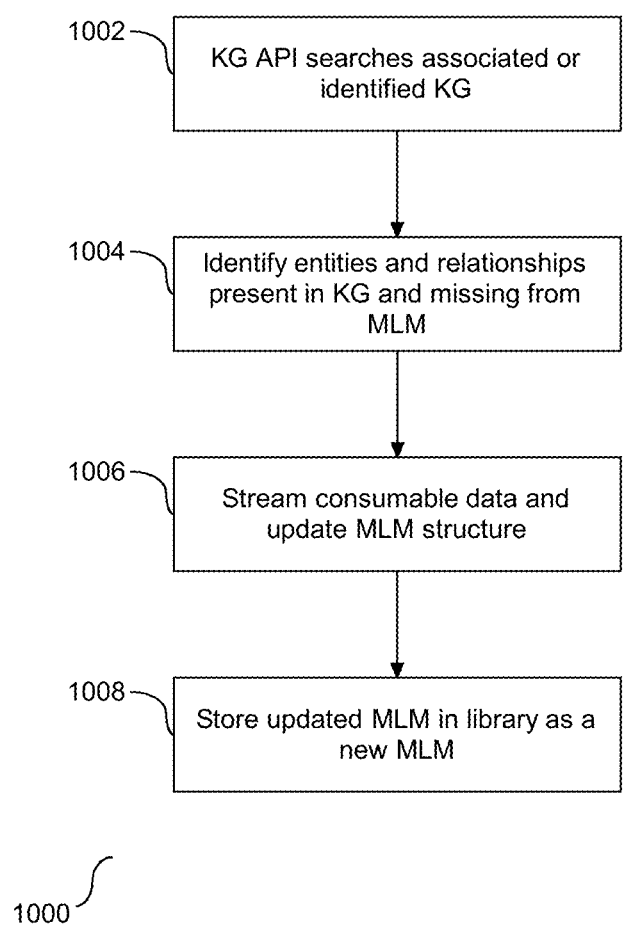
FIG. 10 depicts a flowchart illustrating a process for progressive and adaptive MLM configuration.

Referring to FIG. 10, a flow chart (1000) is provided illustrating a process for progressive and adaptive MLM configuration. The KG API periodically searches an associated or identified KG for new entities, relationships, and data (1002). The identification at step (1002) may be accomplished by checking the data and/or time of the entries within the KG or comparing the entities and relationships from an existing MLM with data contained in the KG. A list of entities and relationships that are present in the KG and absent from the MLM of interest is produced (1004). The list is produced in a format that is consumable by the training tool used to generate MLMs. The consumable data is streamed to update the structure of an existing MLM (1006). In one embodiment, the KG API generates a linguistic statement from the KG that expresses each triplet that can then be fed to the MLM for training. Following step (1006), the updated MLM is stored in an MLM library as a new MLM (1008). In one embodiment, the progressive MLM configuration is incremental as it represents incremental changes of an existing MLM. Incremental machine learning functions to synchronize the MLM with the structure of a KG. Continuous or incremental changes are performed on a target MLM so that with each incremental change, the MLM's capability to extract data from the KG increases and the MLM effectively adapts.

The system and flow charts shown herein may also be in the form of a computer program device for use with an intelligent computer platform in order to facilitate NL processing. The device has program code embodied therewith. The program code is executable by a processing unit to support the described functionality.

As shown and described, in one embodiment, the processing unit supports functionality to search the corpus for evidence of existing KGs and corresponding MLMs together with the corresponding BC ledgers and associated entrie(s). The composite veracity score qualifies and/or quantifies the associated data, and provides a weight for conducting one or more assessments. The recordation of the veracity score together with the associated components in a corresponding BC ledger provides authenticity to the data. Each entry in the outcome set is evaluated based on the corresponding veracity score. As described herein, the KGs are subject to modification, including partitioning and linking, as well as assignment of veracity score components to the data represented or assigned to one or more select KGs. Similarly, as described herein, the MLMs may be dynamically adjusted to reflect structural changes to one or more of the KGs. More specifically, the MLMs adjust to new entities and entity relationships.

It will be appreciated that there is disclosed herein a system, method, apparatus, and computer program product for dynamic MLM generation and augmentation through the use of memory and external learning. As disclosed, the system, method, apparatus, and computer program product apply NL processing to support the MLM, and for the MLM to support the KG persistence.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product are operative to improve the functionality and operation of a machine learning model based on veracity values and leveraging BC technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments of the invention have been described herein for purposes of illustration, various modifications may be made without departing from the spirit and scope of the invention. In particular, the natural language processing may be carried out by different computing platforms or across multiple devices. Furthermore, the data storage and/or corpus may be localized, remote, or spread across multiple systems. Accordingly, the scope of protection of this invention is limited only by the following claims and their equivalents.

What is claimed is:

1. A computer system comprising:
   a processing unit operatively coupled to memory;
   an artificial intelligence platform, in communication with the processing unit and memory;
   a knowledge engine in communication with the processing unit to manage data, including:
     extract data and a data relationship from data selected from the group consisting of: structured data, unstructured data, and combinations thereof;
     create an entry for the extracted data and data relationship in a knowledge graph (KG) and selectively store the extracted data and data relationship in the KG, including assign a veracity value to the stored data;
     create an asset value entry in a blockchain (BC) ledger corresponding to the KG, the entry including the assigned veracity value;
     create a BC identifier corresponding to the BC ledger entry; and
     store the created BC identifier with the KG entry;
     evaluate select data stored in the KG, including employ the BC identifier to determine provenance of the select data and to quantify the data; and
     generate a list of the evaluated data, and sort the data in the generated list based on the assigned veracity value; and
   a data element returned from the sorted list with a strongest veracity score.

2. The system of claim 1, further comprising the knowledge engine to:
   create a first partition within the KG and populate and assign a first reliability value to first data in the first partition;
   create a second partition within the KG and populate and assign a second reliability value to second data in the second partition, wherein the first and second reliability values are different.

3. The system of claim 2, further comprising the knowledge engine to automatically perform a veracity evaluation within the KG, including comparison of the first and second data.

4. The system of claim 1, further comprising the knowledge engine to:
   establish a link between two knowledge graphs, including compare and evaluate data elements in a second KG with data elements in a first KG, and selectively replace data elements based on a value selected from the group consisting of: reliability, feedback, and combinations thereof.

5. The system of claim 4, further comprising the knowledge engine to maintain a structure of the KG constant following establishment of the link between the first KG and the second KG.

6. The system of claim 1, wherein the data is stored in a node in the KG and the relationship is represented as an edge connecting two nodes, each node having a node level veracity value and each relationship having a relationship veracity value, wherein the relationship value is calculated based on the veracity values of the nodes in the relationship.

7. A computer program product to process natural language, the computer program product comprising a computer readable storage device having program code embodied therewith, the program code executable by a processing unit to:
store data in a knowledge graph (KG), comprising:
extract data and a data relationship from data selected from the group consisting of: structured data, unstructured data, and combinations thereof;
create an entry in the KG and selectively store the extracted data and data relationship in the KG, including assign a veracity value to the stored data;
create an asset value entry in a blockchain (BC) ledger corresponding to the KG, the entry including the assigned veracity value;
create a BC identifier corresponding to the BC ledger entry; and
store the created BC identifier with the KG entry;
evaluate select data stored in the KG, including employ the BC identifier to determine provenance of the select data and to quantify the data;
generate a list of the evaluated data, and sort the data in the generated list based on the assigned veracity value; and
generate an outcome, wherein the outcome is a data element returned from the sorted list with a strongest veracity score.

8. The computer program product of claim 7, further comprising program code to:
create a first partition within the KG and populate and assign a first reliability value to first data in the first partition;
create a second partition within the KG and populate and assign a second reliability value to second data in the second partition, wherein the first and second reliability values are different.

9. The computer program product of claim 8, further comprising program code to automatically perform a veracity evaluation within the KG, including comparison of the first and second data.

10. The computer program product of claim 7, further comprising program code to:
establish a link between two knowledge graphs, including compare and evaluate data elements in a second KG with data elements in a first KG, and selectively replace data elements based on a value selected from the group consisting of: reliability, feedback, and combinations thereof.

11. The computer program product of claim 10, further comprising program code to maintain a structure of the KG constant following establishment of the link between the first KG and the second KG.

12. The computer program product of claim 7, wherein the data is stored in a node in the KG and the relationship is represented as an edge connecting two nodes, each node having a node level veracity value and each relationship having a relationship veracity value, wherein the relationship value is calculated based on the veracity values of the nodes in the relationship.

13. A method for processing natural language, comprising:
storing data in a knowledge graph (KG), comprising:
extracting data and a data relationship from data selected from the group consisting of: structured data, unstructured data, and combinations thereof;
creating an entry in the KG and selectively storing the extracted data and data relationship in the KG, including assigning a veracity value to the stored data;
creating an asset value entry in a blockchain (BC) ledger corresponding to the KG, the entry including the assigned veracity value;
creating a BC identifier corresponding to the BC ledger entry; and
storing the created BC identifier with the KG entry;
evaluating select data stored in the KG, including employing the BC identifier to determine provenance of the select data and to quantify the data;
generating a list of the evaluated data, and sorting the data in the generated list based on the assigned veracity value; and
a data element returned from the sorted list with a strongest veracity score.

14. The method of claim 13, further comprising
creating a first partition within the KG and populating and assigning a first reliability value to first data in the first partition;
creating a second partition within the KG and populating and assigning a second reliability value to second data in the second partition, wherein the first and second reliability values are different.

15. The method of claim 14, further comprising automatically performing a veracity evaluation within the KG, including comparison of the first and second data.

16. The method of claim 13, further comprising:
establishing a link between two knowledge graphs, including comparing and evaluating data elements in a second KG with data elements in a first KG, and selectively replacing data elements based on a value selected from the group consisting of: reliability, feedback, and combinations thereof.

17. The method of claim 16, further comprising maintaining a structure of the KG constant following establishment of the link between the first KG and the second KG.

18. The method of claim 13, wherein the data is stored in a node in the KG and the relationship is represented as an edge connecting two nodes, each node having a node level veracity value and each relationship having a relationship veracity value, wherein the relationship value is calculated based on the veracity values of the nodes in the relationship.

* * * * *